(12) United States Patent
Demirkiran

(10) Patent No.: US 6,595,016 B1
(45) Date of Patent: Jul. 22, 2003

(54) PORTABLE REFRIGERATOR KIT FOR PERISHABLE PET PRODUCTS

(76) Inventor: Arzu Demirkiran, 88-18-107$^{TH}$ Ave., Ozone Park, NY (US) 11417

( * ) Notice: Subject to any disclaimer, the term of this patent is extended or adjusted under 35 U.S.C. 154(b) by 0 days.

(21) Appl. No.: 10/163,989

(22) Filed: Jun. 6, 2002

(51) Int. Cl.$^7$ .............................. F25D 3/08; F25B 27/00
(52) U.S. Cl. ...................... 62/236; 62/457.9; 62/3.62; 62/238.2; 62/267
(58) Field of Search ............................ 62/457.9, 3.62, 62/267, 236, 238.2

(56) References Cited

U.S. PATENT DOCUMENTS

| | | | | |
|---|---|---|---|---|
| 4,429,549 A | * | 2/1984 | Randolphi ................... 62/342 |
| 4,457,140 A | * | 7/1984 | Rastelli ....................... 62/261 |
| 5,265,501 A | * | 11/1993 | Reyes ......................... 81/3.08 |
| 5,291,746 A | * | 3/1994 | Abbott ......................... 62/89 |
| 5,374,118 A | * | 12/1994 | Kruck et al. ................. 312/407 |
| 5,544,495 A | * | 8/1996 | Anderson et al. .......... 62/457.7 |
| 6,269,653 B1 | * | 8/2001 | Katusa ....................... 62/427.9 |

* cited by examiner

Primary Examiner—William C. Doerrler
Assistant Examiner—Mark Shulman

(57) ABSTRACT

A portable refrigerator kit for perishable pet products for keeping perishable pet products from spoiling while the user is out camping with one's pets. The portable refrigerator kit for perishable pet products includes a boxlike assembly including a boxlike member having outer and inner walls, and also having upper and lower floors, and further having an open top with the boxlike assembly also including a partition disposed in and separating the boxlike member into compartments; and also includes a refrigeration assembly being disposed in the boxlike assembly and including a motor being disposed between the upper and lower floors, and also including a compressor being connected to the motor, and further including coils being connected to the compressor for cooling the boxlike member; and further includes container members being removably disposed in the compartments of the boxlike member; and further includes an assembly for supplying power to the refrigeration assembly; and also an assembly for opening bottles and cans.

6 Claims, 4 Drawing Sheets

PORTABLE REFRIGERATOR KIT FOR PERISHABLE PET PRODUCTS

BACKGROUND OF THE INVENTION

1. Field of the Invention

The present invention relates to portable refrigerator kits and more particularly pertains to a new portable refrigerator kit for perishable pet products for keeping perishable pet products from spoiling while the user is out camping with one's pets.

2. Description of the Prior Art

The use of portable refrigerator kits is known in the prior art. More specifically, portable refrigerator kits heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,759,190 5,787,839; 5,701,757; 5,598,713; 5,398,520; and U.S. Pat. No. Des. 400,053.

While these devices fulfill their respective, particular objectives and requirements, the aforementioned patents do not disclose a new portable refrigerator kit for perishable pet products.

SUMMARY OF THE INVENTION

The general purpose of the present invention, which will be described subsequently in greater detail, is to provide a new portable refrigerator kit for perishable pet products which has many of the advantages of the portable refrigerator kits mentioned heretofore and many novel features that result in a new portable refrigerator kit for perishable pet products which is not anticipated, rendered obvious, suggested, or even implied by any of the prior art portable refrigerator kits, either alone or in any combination thereof. The present invention includes a boxlike assembly including a boxlike member having outer and inner walls, and also having upper and lower floors, and further having an open top with the boxlike assembly also including a partition disposed in and separating the boxlike member into compartments; and also includes a refrigeration assembly being disposed in the boxlike assembly and including a motor being disposed between the upper and lower floors, and also including a compressor being connected to the motor, and further including coils being connected to the compressor for cooling the boxlike member; and further includes container members being removably disposed in the compartments of the boxlike member; and further includes an assembly for supplying power to the refrigeration assembly; and also an assembly for opening bottles and cans. None of the prior art includes the combination of the elements of the present invention.

There has thus been outlined, rather broadly, the more important features of the portable refrigerator kit for perishable pet products in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new portable refrigerator kit for perishable pet products which has many of the advantages of the portable refrigerator kits mentioned heretofore and many novel features that result in a new portable refrigerator kit for perishable pet products which is not anticipated, rendered obvious, suggested, or even implied by any of the prior art portable refrigerator kits, either alone or in any combination thereof.

Still another object of the present invention is to provide a new portable refrigerator kit for perishable pet products for keeping perishable pet products from spoiling while the user is out camping with one's pets.

Still yet another object of the present invention is to provide a new portable refrigerator kit for perishable pet products that is easy and convenient to take along and use, in particular for perishable pet products.

Even still another object of the present invention is to provide a new portable refrigerator kit for perishable pet products that prevents food and drink products from spilling during travel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
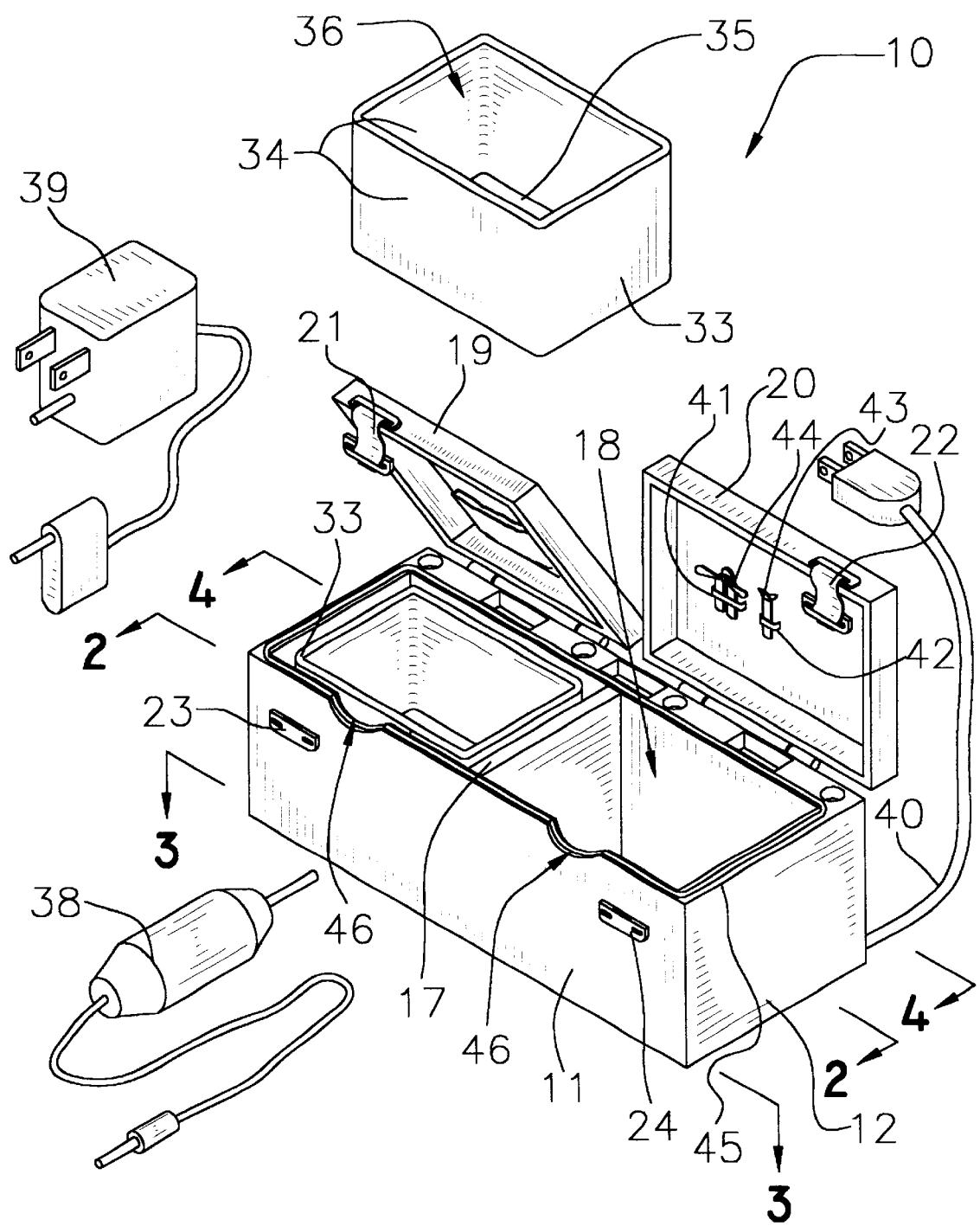
FIG. 1 is a perspective view of a new portable refrigerator kit for perishable pet products according to the present invention.
Figure 2:
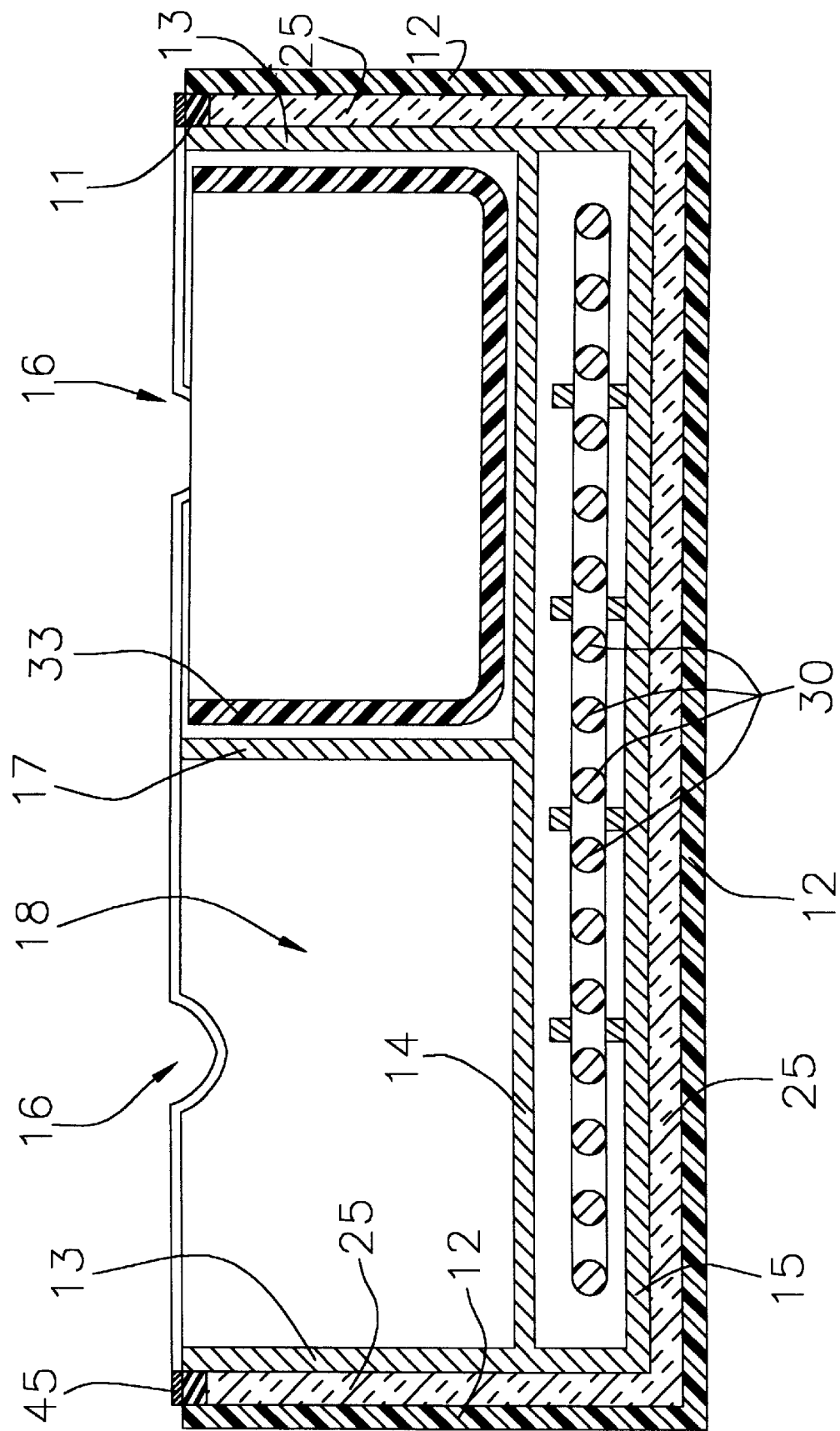
FIG. 2 is a front longitudinal cross-sectional view of the present invention.
Figure 3:
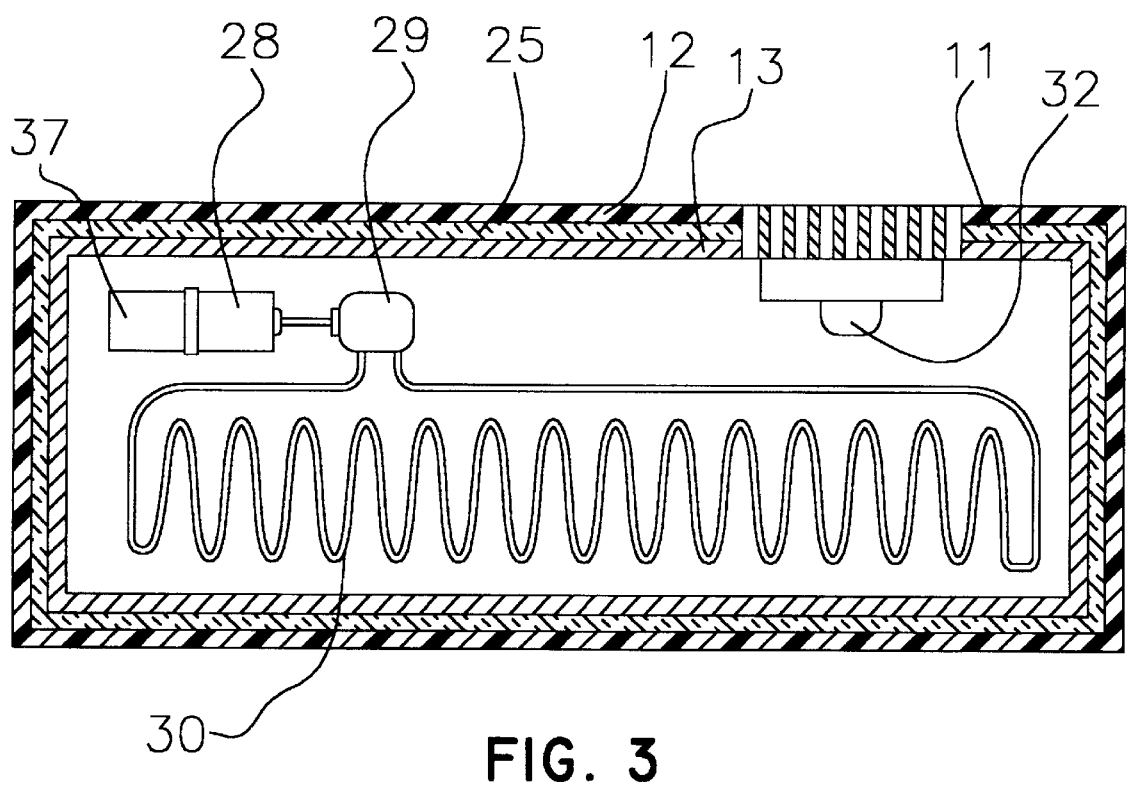
FIG. 3 is a lateral cross-sectional view of the present invention.
Figure 4:
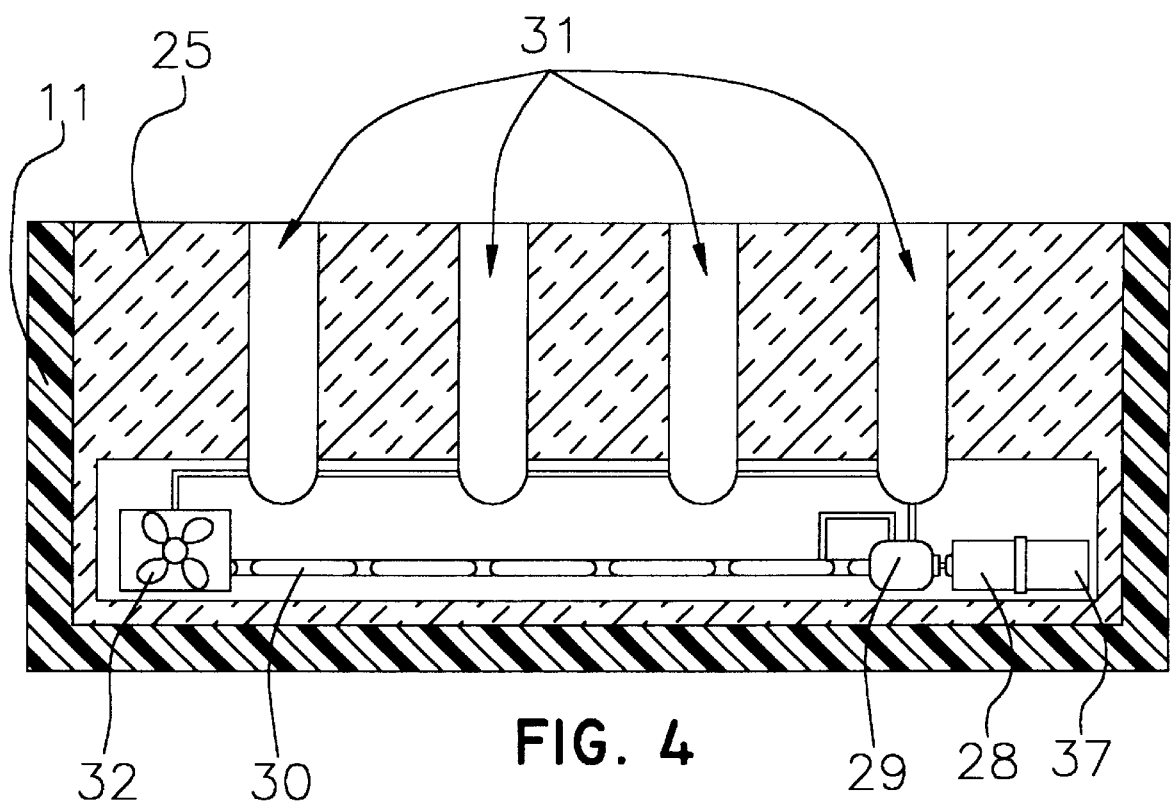
FIG. 4 is a rear longitudinal cross-sectional view of the present invention.

With reference now to the drawings, and in particular to FIGS. 1 through 4 thereof, a new portable refrigerator kit for perishable pet products embodying the principles and concepts of the present invention and generally designated by the reference numeral 10 will be described.

As best illustrated in FIGS. 1 through 4, the portable refrigerator kit for perishable pet products 10 generally comprises a boxlike assembly including a boxlike member 11 having outer and inner walls 12,13, and also having upper and lower floors 14,15, and further having an open top 16. The boxlike assembly also includes a partition 17 being securely and conventionally disposed in and separating the boxlike member 11 into compartments 18. The box-like assembly further includes a pair of lids 19,20 being hingedly and conventionally attached to one of the outer walls 12 of the boxlike member 11 and being removably disposed over the open top 16 of the boxlike member 11, and also includes conventional latch members 21,22 being conventionally attached to the lids 19,20 for securing the lids 19,20 over the open top 16 of the boxlike member 11, and further includes conventional catch members 23,24 being conventionally attached to an outer side of one of the outer walls 12 of the boxlike member 11 and to which the latch members 21,22 are releaseably attached. The boxlike assembly also includes sheets of insulating material 25 being conventionally disposed between the outer and inner walls 12,13 and the lower floor 15 of the boxlike member 11. The boxlike assembly further includes a magnetized seal member 45 being conventionally disposed upon top edges of the inner and outer walls 12,13 of the boxlike member 11 to effectively seal the boxlike member 11 upon the lids 19,20 being securely closed over the open top 16 of the boxlike member 11. The boxlike assembly also includes a pocket 27 being conventionally attached to one of the lids 19 for holding sheets of cleaning members. The boxlike member 11 has arcuate slots 46 being disposed in the top edge of one of the outer walls 12 and one of the inner walls 13.

A refrigeration assembly is conventionally disposed in the boxlike assembly and includes a motor 28 being conventionally disposed between the upper and lower floors 14,15, and also includes a conventional compressor 29 being conventionally connected to the motor 28, and further includes conventional cooling coils 30 being conventionally connected to the compressor 29. The refrigeration assembly further includes conventional condensers 31 being spacedly disposed between one of the inner walls 13 and one of the outer walls 12, and further includes a conventional fan member 32 being conventionally connected with a conduit to the condensers 31 and being conventionally disposed between the upper and lower floors 14,15 of the boxlike member 11 for drawing in air through the condensers 31 between the upper and lower floors 14,15.

Container members 33 are removably disposed in the compartments 17 of the boxlike member 11. Each of the container members 34 has side and bottom walls 34,35 and an open top 36 for storing perishable pet products such as food and liquids with the container members 33 being removably received in the compartments 17 in the boxlike member 11.

Means for supplying power to the refrigeration assembly includes a battery pack 37 being conventionally connected with wires to the motor 28 and to the fan member 32, and also includes a cigarette lighter adapter plug and cord 38 being insertable into the boxlike member 11 and being conventionally connectable to the battery pack 37, and further includes a battery charger adapter and plug 39 being insertable into the boxlike member 11 and being conventionally connectable to the battery pack 37, and also includes a power cord 40 being conventionally connected to the motor 28 and the fan member 32 through the boxlike member 11.

Means for opening bottles and cans includes bracket members 41,42 being conventionally attached to an underside of one of the lids 20, and also includes a bottle opener 43 being removably supported upon one of the bracket members 42, and further includes a can opener 44 being removably supported upon another of the bracket members 41.

In use, the user packs the container members 33 with pet foods and drinks and places the container members 33 in the compartments 17 of the boxlike member 11, and securely closes and latches the lids 19,20 upon the open top 16 of the boxlike member 11 with the battery pack 37 energizing the motor 28 and the fan member 32 to effectively cool the pet products inside the boxlike member 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the portable refrigerator kit for perishable pet products. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable refrigerator kit for perishable pet products comprising:

a boxlike assembly including a boxlike member having outer and inner walls, and also having upper and lower floors, and further having an open top, said boxlike assembly also including a partition disposed in and separating said boxlike member into compartments, said box-like assembly further including lids being hingedly attached to one of said outer walls of said boxlike member and being removably disposed over said open top of said boxlike member, and also including latch members being attached to said lids for securing said lids over said open top of said boxlike member, and further including catch members being attached to an outer side of one of said outer walls of said boxlike member and to which said latch members are releaseably attached, said boxlike assembly also including sheets of insulating material being disposed between said outer and inner walls and said lower floor of said boxlike member;

a refrigeration assembly being disposed in said boxlike assembly and including a motor being disposed between said upper and lower floors, and also including a compressor being connected to said motor, and further including coils being connected to said compressor;

container members being removably disposed in said compartments of said boxlike member;

means for supplying power to said refrigeration assembly; and means for opening bottles and cans.

2. A portable refrigerator kit as described in claim 1, wherein said boxlike assembly further includes a magnetized seal member being disposed upon top edges of said inner and outer walls of said boxlike member to effectively seal said boxlike member upon said lids being securely closed over said open top of said boxlike member.

3. A portable refrigerator kit as described in claim 2, wherein said boxlike assembly also includes a pocket being attached to one of said lids for holding sheets of cleaning members.

4. A portable refrigerator kit as described in claim 3, wherein said boxlike member includes arcuate slots being disposed in said top edge of one of said inner walls and one of said outer walls thereof for easy access to said container members in said boxlike member.

5. A portable refrigerator kit for perishable pet products in comprising:
   a boxlike assembly including a boxlike member having outer and inner walls, and also having upper and lower floors, and further having an open top, said boxlike assembly also including a partition disposed in and separating said boxlike member into compartments;
   a refrigeration assembly being disposed in said boxlike assembly and including a motor being disposed between said upper and lower floors, and also including a compressor being connected to said motor, and further including coils being connected to said compressor;
   container members being removably disposed in said compartments of said boxlike member, each of said container members having side and bottom walls and an open top for storing perishable pet products such as food and liquids, said container members being removably received in said compartments in said boxlike member;
   means for supplying power to said refrigeration assembly; and
   means for opening bottles and cans.

6. A portable refrigerator kit for perishable pet products comprising:
   a boxlike assembly including a boxlike member having outer and inner walls, and also having upper and lower floors, and further having an open top, said boxlike assembly also including a partition disposed in and separating said boxlike member into compartments;
   a refrigeration assembly being disposed in said boxlike assembly and including a motor being disposed between said upper and lower floors, and also including a compressor being connected to said motor, and further including coils being connected to said compressor;
   container members being removably disposed in said compartments of said boxlike member;
   means for supplying power to said refrigeration assembly; and
   means for opening bottles and cans, said means for opening bottles and cans including bracket members being attached to an underside of at least one of said lids, and also including a bottle opener being removably supported upon one of said bracket members, and further including a can opener being removably supported upon another of said bracket members.

* * * * *